(12) United States Patent
Song

(10) Patent No.: US 11,010,126 B1
(45) Date of Patent: May 18, 2021

(54) HEADSET, CONTROL MODULE AND METHOD FOR AUTOMATIC ADJUSTMENT OF VOLUME OF HEADSET, AND STORAGE MEDIUM

(71) Applicant: MERRY ELECTRONICS (SUZHOU) CO., LTD., Suzhou (CN)

(72) Inventor: Guoming Song, Suzhou (CN)

(73) Assignee: MERRY ELECTRONICS (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 16/930,031

(22) Filed: Jul. 15, 2020

(30) Foreign Application Priority Data

Nov. 1, 2019 (CN) .......................... 201911063441.5

(51) Int. Cl.
| | |
|---|---|
| H03G 3/20 | (2006.01) |
| G06F 3/16 | (2006.01) |
| G06F 3/01 | (2006.01) |
| H04R 29/00 | (2006.01) |
| G10L 25/51 | (2013.01) |
| G10L 25/84 | (2013.01) |
| H04R 3/04 | (2006.01) |
| H04R 1/10 | (2006.01) |

(52) U.S. Cl.
CPC .............. *G06F 3/165* (2013.01); *G06F 3/012* (2013.01); *G10L 25/51* (2013.01); *G10L 25/84* (2013.01); *H04R 1/1041* (2013.01); *H04R 1/1075* (2013.01); *H04R 3/04* (2013.01); *H04R 29/001* (2013.01); *H04R 2430/01* (2013.01)

(58) Field of Classification Search
CPC ......... G06F 3/165; G06F 3/012; G10L 25/51; G10L 25/84; H04R 1/1041
See application file for complete search history.

(56) References Cited

U.S. PATENT DOCUMENTS

| | | | | |
|---|---|---|---|---|
| 5,450,494 A | * | 9/1995 | Okubo ..................... | H03G 3/32 348/E5.122 |
| 2009/0016542 A1 | * | 1/2009 | Goldstein .............. | H04R 3/005 381/57 |

(Continued)

FOREIGN PATENT DOCUMENTS

| | | |
|---|---|---|
| CN | 204733342 U | 10/2015 |
| CN | 105446697 A | 3/2018 |

*Primary Examiner* — Simon King
(74) *Attorney, Agent, or Firm* — Birch, Stewart, Kolasch & Birch, LLP

(57) ABSTRACT

The present invention discloses a headset, a control module and method for automatic adjustment of a volume of the headset, and a storage medium. The control module comprises an audio signal sampling and MIC module, a headset acoustic characteristic recording module, an acoustic feature analyzing module, an external sound signal analyzing module and a volume adjustment module. The volume adjustment module may determine a person speaking and automatically control the headset to lower the volume or mute when the strength of the external voice signal is larger than a preset threshold value. The control module of the present invention may automatically decrease the volume of the headset by identifying a voice signal from the external environment or the user, such that the user may make normal communication with other person without taking off the headset and the hearing of the user may not be damaged.

15 Claims, 7 Drawing Sheets

(56) References Cited

U.S. PATENT DOCUMENTS

| | | | | |
|---|---|---|---|---|
| 2009/0034765 A1* | 2/2009 | Boillot | ................ | H04R 1/1016 381/309 |
| 2010/0074451 A1* | 3/2010 | Usher | .................... | H04R 29/00 381/58 |
| 2016/0330546 A1* | 11/2016 | Barrentine | ......... | G10K 11/1783 |

* cited by examiner

HEADSET, CONTROL MODULE AND METHOD FOR AUTOMATIC ADJUSTMENT OF VOLUME OF HEADSET, AND STORAGE MEDIUM

CROSS-REFERENCE TO RELATED APPLICATIONS

This non-provisional application claims priority under 35 U.S.C. § 119(a) on Patent Application No. 201911063441.5 filed in P.R. China on Nov. 1, 2019, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

TECHNICAL FIELD

The present invention relates to a device for playing and receiving audio signal, and particularly to a device and method for automatic adjustment of a volume of a headset.

BACKGROUND ART

Currently, most of the available headsets have functions of hearing protection, dynamic control and the like, and the technology of the automatic adjustment of the volume is widely used. As an example, the headset having the function of hearing protection may timely lower the volume according to actual usage of the headset to protect the user's hearing. As another example, the headset having the function of dynamic volume control may dynamically suppress the peak or spike in the played audio signal that may adversely affect the user's experience.

The U.S. Pat. No. 5,450,494 discloses acquiring the environmental noise outside the headset by processing an incoming signal received by MIC of the headset. In addition, the patent CN105446697A discloses sampling the noise outside the headset and the sound of music played by the headset.

Although the automatic adjustment of the volume of the headset can be achieved in the prior art, the volume is generally adjusted based on known or predicted internal cause, i.e., the actual usage of the headset or the played audio file. When the user listens to music with the headset and the people around the user talks with him(her), the user often cannot hear what the people says due to the isolation of the headset and the influence of the music, and will unconsciously increases his(her) speaking voice. Alternatively, if the external sound is relatively large, the user has to increase the volume of the music to improve the hearing effect, but listening to the music at high volume for a long time may result in the hearing loss.

Therefore, it is necessary to further improve the prior art in view of the inconvenience and deficiencies in practical application of the prior art.

DISCLOSURE OF THE PRESENT INVENTION

An object of the present invention is to provide a headset and a control method and module for automatic adjustment of the volume of the headset, which may watch for the constantly changed external noise or environmental sound according to the actual usage of the headset or the played audio file and adjust the volume of the headset accordingly.

To achieve the above object, the present invention provides a control module for automatic adjustment of a volume of an headset, comprising: an audio signal sampling and MIC module for sampling an external real-time sound signal and converting the real-time sound signal into an electrical signal; a headset acoustic characteristic recording module for recording a system inherent acoustic characteristic of the headset; an acoustic feature analyzing module electrically connected to the audio signal sampling and MIC module and the headset acoustic characteristic recording module for removing an audio signal played by the headset from the real-time sound signal based on the system inherent acoustic characteristic of the headset to obtain a pure external noise and voice signal outside the headset; an external sound signal analyzing module electrically connected to the acoustic feature analyzing module for analyzing frequency features of the pure external noise and voice signal to obtain a strength of an external voice signal; and a volume adjustment module electrically connected to the external sound signal analyzing module for determining the condition a person speaking and automatically controlling the headset to lower a volume or mute when the strength of the external voice signal is larger than a preset threshold value.

In the control module for automatic adjustment of the volume of the headset, the volume adjustment module automatically controls the headset to restore a normal volume when the strength of the external voice signal is determined to be less than the preset threshold value for a period of time.

In the control module for automatic adjustment of the volume of the headset, the system inherent acoustic characteristic of the headset is obtained by playing a sweep signal for testing through a speaker of the headset.

In the control module for automatic adjustment of the volume of the headset, the system inherent acoustic characteristic of the headset comprises a frequency response, a delay and/or a phase.

In the control module for automatic adjustment of the volume of the headset, the acoustic feature analyzing module obtains the strength of the external voice signal by extracting a voice frequency component using a digital filter processing device and identifying the voice frequency component according to voice characteristic.

In the control module for automatic adjustment of the volume of the headset, the acoustic feature analyzing module obtains a strength of an external noise component by filtering out the identified voice frequency component.

In the control module for automatic adjustment of the volume of the headset, the digital filter processing device is a digital filter, or a filter unit inside a digital signal processor (DSP).

In the control module for automatic adjustment of the volume of the headset, the volume adjustment module adjusts the volume of the headset according to a level of a strength of the external noise signal graded by the acoustic feature analyzing module.

In the control module for automatic adjustment of the volume of the headset, the acoustic feature analyzing module performs a convolution operation on the audio signal and a measured function of the inherent acoustic characteristic of the headset to obtain an influence signal that affects the audio signal sampling and MIC module when the headset plays the audio signal.

In the control module for automatic adjustment of the volume of the headset, the pure external noise and voice signal is obtained by removing the influence signal from an incoming signal of the audio signal sampling and MIC module using the external sound signal analyzing module.

To achieve the above object, the present invention further provides a headset, comprising: a housing provided with a sound output port; a speaker provided inside the housing for playing an audio signal; and a controller electrically connected to the speaker, wherein the controller comprises the above control module for automatic adjustment of the volume of the headset.

The headset further comprises an acceleration sensor connected to the controller and provided inside the housing, for sampling an action sensing signal of rapidly raising or lowering head of a user of the headset; the controller further comprises a user action analyzing module for identifying a received action sensing signal of rapidly raising or lowering head of the user; and the volume adjustment module controls the headset to increase or decrease the volume or pause playing based on the action sensing signal.

To achieve the above object, the present invention further provides a method for automatic adjustment of a volume of an headset, comprising: an audio signal sampling step for sampling a real-time sound signal outside the headset and converting the real-time sound signal into an electrical signal; an headset acoustic characteristic recording step for recording a system inherent acoustic characteristic of the headset; an acoustic feature analyzing step for removing an audio signal played by the headset from the real-time sound signal based on the system inherent acoustic characteristic of the headset to obtain a pure external noise and voice signal outside the headset; an external sound signal analyzing step for analyzing frequency feature of the pure external noise and voice signal to obtain a strength of an external voice signal; and a volume adjustment step for determining the condition a person speaking and automatically controlling the headset to lower a volume or mute when the strength of the external voice signal is larger than a preset threshold value.

In the method for automatic adjustment of the volume of the headset, in the volume adjustment step, the headset is controlled to restore a normal volume when the strength of the external voice signal is determined to be less than the preset threshold value for a period of time.

In the method for automatic adjustment of the volume of the headset, the system inherent acoustic characteristic of the headset is obtained by playing a sweep signal for testing through a speaker of the headset.

In the method for automatic adjustment of the volume of the headset, the system inherent acoustic characteristic of the headset comprises a frequency response, a delay and/or a phase.

In the method for automatic adjustment of the volume of the headset, in the acoustic feature analyzing step, the strength of the external voice signal is obtained by extracting a voice frequency component using a digital filter processing and identifying the voice frequency component according to voice characteristic.

In the method for automatic adjustment of the volume of the headset, in the acoustic feature analyzing step, a strength of an external noise component is obtained by filtering out the identified voice frequency component.

In the method for automatic adjustment of the volume of the headset, in the acoustic feature analyzing step, the volume of the headset is adjusted within a range of 10 dB according to a level of the strength of the external noise signal.

In the method for automatic adjustment of the volume of the headset, in the acoustic feature analyzing step, an influence signal that affects an audio signal sampling and MIC module when the headset plays the audio signal is obtained by performing a convolution operation on the audio signal and a measured function of the inherent acoustic characteristic of the headset.

In the method for automatic adjustment of the volume of the headset, in the external sound signal analyzing step, the pure external noise and voice signal is obtained by removing the influence signal from an incoming signal of the audio signal sampling and MIC module.

To achieve the above object, the invention further provides a storage medium for storing a program executing the control method.

According to the present invention, the volume of the headset may be automatically decreased by identifying a voice signal from the external environment or the user, such that the user may make normal communication with other person without taking off the headset, and the hearing of the user may not be damaged by listening to music for a long time.

According to the present invention, the volume of the headset may also be adjusted based on the strength of the external noise (from which the voice component is removed), such that the user is always supplied with appropriate volume, thereby minimizing the damage to the hearing of the user.

DETAILED DESCRIPTION OF THE EXEMPLARY EMBODIMENTS

To make the object, the technical solution and the advantage of the present invention clear, the present invention will be explained in detail with reference to the appended drawings and the embodiments. It shall be understood that "one embodiment", "embodiment", "exemplary embodiments" and the like in the description refer to that the embodiment may comprise specific feature, structure or characteristics, but it is unnecessary for each embodiment to comprise such specific feature, structure or characteristics. Moreover, "one embodiment", "embodiment", "exemplary embodiments" and the like in the description may not refer to the same embodiment. Further, when the specific feature, structure or characteristics is described with reference to one embodiment, it shall be understood that such specific feature, structure or characteristics may be incorporated into other embodiment.

Although specific terms are used in the description and the claims to refer to components or parts, it shall be understood that the technician or manufacturer can give a different name or term to the same component or part. The description and the claims distinguish components or parts from each other by the different functions of the components or parts, instead of the different names. "Comprise" and "include" in the description and the claims are open words and should be explained as "include but is not limited to". In addition, "connection" herein includes any direct or indirect electrical connection. Indirect electrical connection comprises connection via other device.

Figure 1:
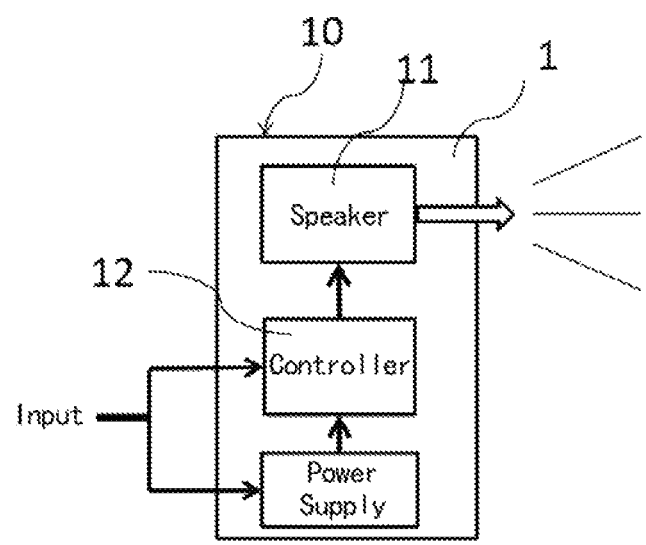
FIG. 1 shows a headset according to an embodiment of the present invention.
Figure 2:
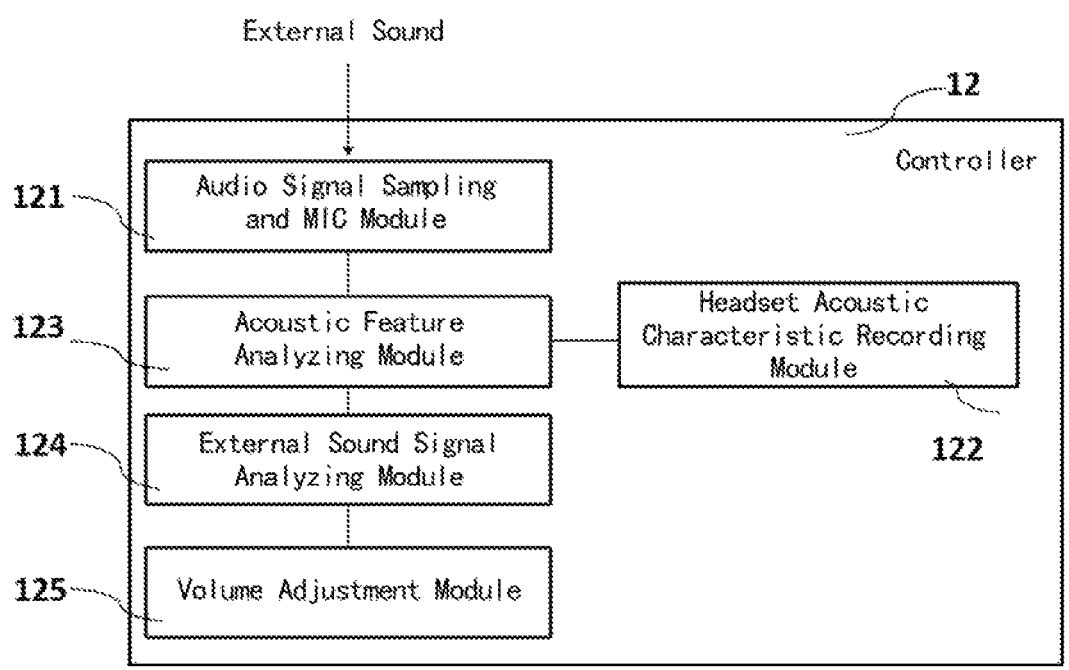
FIG. 2 shows a control module for automatic adjustment of a volume of a headset according to an embodiment of the present invention.

In FIGS. 1 and 2, a headset 1 of the present invention comprises: a housing 10, and a speaker 11 and a controller 12 provided inside the housing 10. The speaker 11 is electrically connected to the controller 12. In one embodiment, the headset 1 is connected to an external audio signal source, which may be any type of audio player, such as smart phone, IPAD, laptop, e-book and portable disc player, via an audio line interface, such as an active fidelity metal wire, or a wireless connection, such as WIFI, Bluetooth and the like.

In the embodiment of FIGS. 1 and 2, the controller 12 of the headset 1 is a control circuit having a digital signal processor (DSP) comprising: an audio signal sampling and MIC module 121 for converting the sampled real-time sound signal outside the headset into a digital audio signal; an headset acoustic characteristic recording module 122 for storing a system inherent acoustic characteristic parameter of the headset, such as frequency response, delay and/or phase, in an internal storage; an acoustic feature analyzing module 123 for removing an audio signal played by the headset 1 from the real-time sound signal based on the system inherent acoustic characteristic of the headset stored in the storage, to obtain a pure external noise and voice signal outside the headset; an external sound signal analyzing module 124 for analyzing frequency feature of the pure external noise and voice signal to obtain a strength of an external voice signal; and a volume adjustment module 125 for determining the condition a person speaking and automatically controlling the headset to lower the volume or mute when the strength of the external voice signal is larger than a preset threshold value, which is set as a default value before the headset is delivered from the factory. In other embodiment, the external voice may be played by the speaker 11 after received by the audio signal sampling and MIC module 121, and the volume of the headset may be automatically restored to a normal volume when the strength of the external voice signal is less than the preset threshold value for a period of time. In other embodiment, the user may initiatively control the headset to restore the normal volume, for example, by rapidly raising or lowering head to increase or decrease the volume or pause the playing of the headset.

Figure 3:
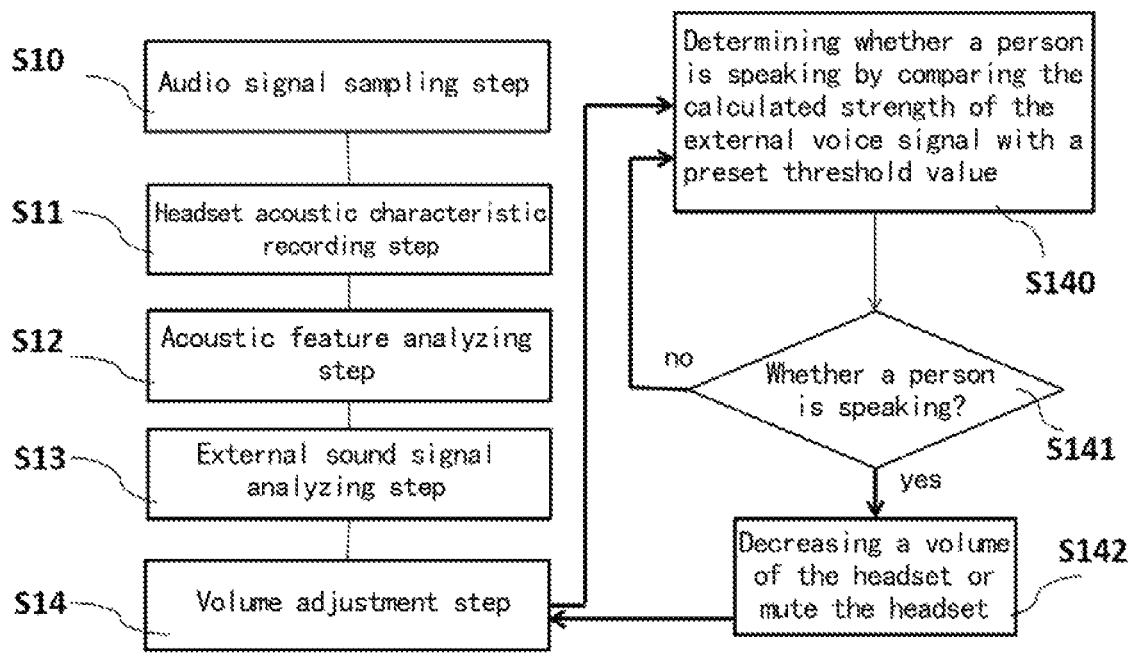
FIG. 3 shows a control method for automatic adjustment of a volume of a headset according to an embodiment of the present invention.

In the embodiment of FIGS. 1, 2 and 3, when the headset operates normally, the audio signal sampling and MIC module 121 of the headset 1 timely detects the noise and voice signal of the external environment. Because the music played by the headset 1 is also detected by the audio signal sampling and MIC module 121, the influence signal generated by playing the music is removed based on the system inherent acoustic characteristic of the headset 1 stored in the storage to obtain an accurate external noise and voice signal, before analyzing the signal components.

In one embodiment of the present invention, the controller 12 is implemented as a specialized digital signal processor (DSP), and the strength of the external voice signal may be obtained by extracting the voice frequency component and identifying the voice frequency component according to the voice characteristic. Alternatively, the strength of the external noise signal may be obtained by filtering out the identified voice frequency component. The acoustic feature analyzing module 123 performs a convolution operation on the audio signal and the measured function of the inherent acoustic characteristic of the headset to obtain the influence signal that affects the audio signal sampling and MIC module 121 when the headset plays a music signal.

In one embodiment of the present invention, the audio signal filter function of the acoustic feature analyzing module 123 may be implemented by a filter circuit, which identifies the strength of the external voice signal and filter out the identified voice frequency component to obtain the strength of the external noise component.

Figure 4:
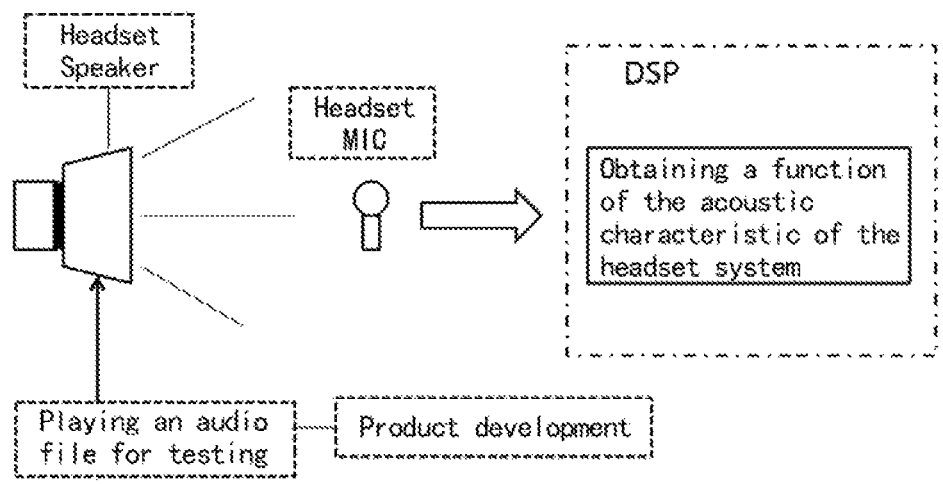
FIG. 4 shows a step of obtaining a function of system acoustic characteristic of a headset in a control method of an embodiment as shown in FIG. 3.

In the embodiment of FIGS. 1 and 2, the system inherent acoustic characteristic of the headset is obtained by playing a sweep signal from testing through the speaker of the headset during the development stage before the delivery of the headset from the factory, as shown in FIG. 4.

Moreover, in the embodiment of FIGS. 1 and 2, when the user of the headset desires to increase or decrease the volume, the volume may be adjusted within a range of 10 dB according to the level of the strength of the external noise signal.

In another embodiment, when the user of the headset is surrounded by noisy crowd, the user may determine by oneself whether the volume should be decreased to avoid any error action or bad experience. For example, in the embodiment of FIG. 6, a switch button 16 or similar digital button may be provided and the voice command of on/off may be input to disable the function of automatic volume adjustment. Furthermore, in FIGS. 6 and 7, an acceleration sensor 14 may be provided in the headset, and a user action analyzing module 126 may be provided in the controller. The user action analyzing module 126 may identify the rapidly raising or lowering head of the user by analyzing an action sensing signal from the acceleration sensor 14, and the volume adjustment module 125 may increase or decrease the volume or pause the playing of the headset based on the action sensing signal.

In one embodiment of the present invention, the headset may be provided with a battery and may be wirelessly connected to a sound source player. For example, the headset 1 may be a headset supporting wireless connection, such as Bluetooth, WIFI, and the like. The headset may also transmit the power supply signal and the audio signal through the metal wire.

FIG. 3 shows a method for automatic adjustment of a volume of a headset according to another embodiment of the present invention, the method comprising: an audio signal sampling step S10 for converting the received real-time sound signal outside the headset into an electrical signal; a headset acoustic characteristic recording step S11 for recording a system inherent acoustic characteristic of the headset sampled by the audio signal sampling and MIC module; an acoustic feature analyzing step S12 for removing an audio signal played by the headset from the sound signal based on the system inherent acoustic characteristic of the headset to obtain a pure external noise and voice signal outside the headset; an external sound signal analyzing step S13 for analyzing frequency feature of the pure external noise and voice signal to obtain a strength of an external voice signal; and a volume adjustment step S14 for determining the condition a person speaking and automatically controlling the headset to lower a volume or mute when the strength of the external voice signal is larger than a preset threshold value.

Further, in the volume adjustment step S14, when the strength of the external voice signal is determined to be less than the preset threshold value for a period of time, the volume of the headset may be automatically restored to normal volume.

Figure 5:
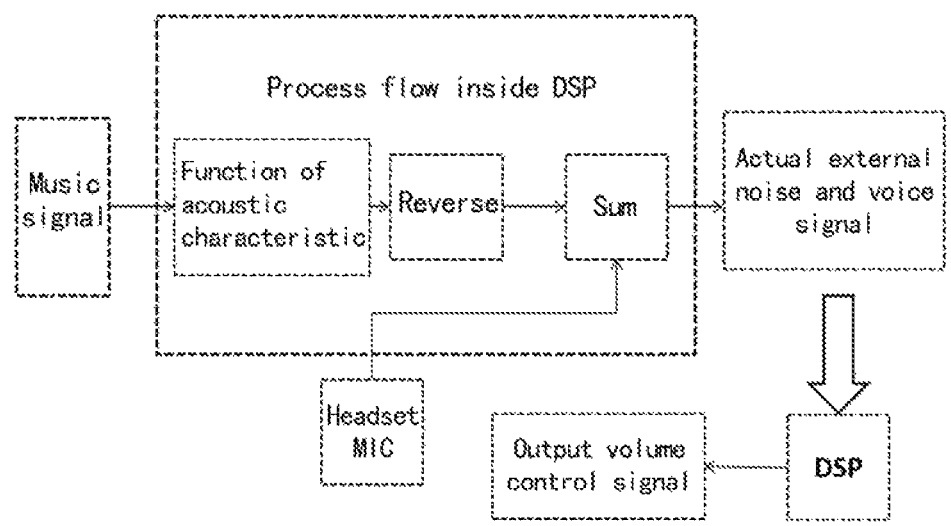
FIG. 5 is a flow diagram showing a volume control inside a headset when the user uses the headset.
Figure 6:
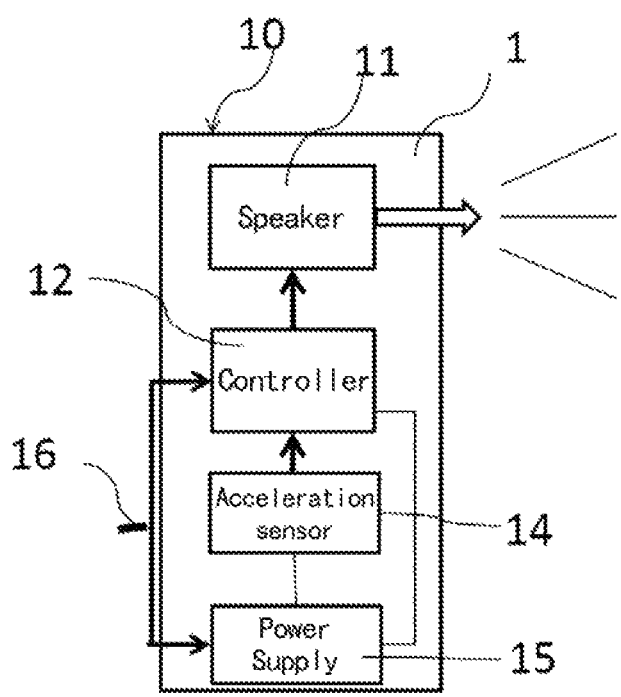
FIG. 6 shows a headset according to another embodiment of the present invention.
Figure 7:
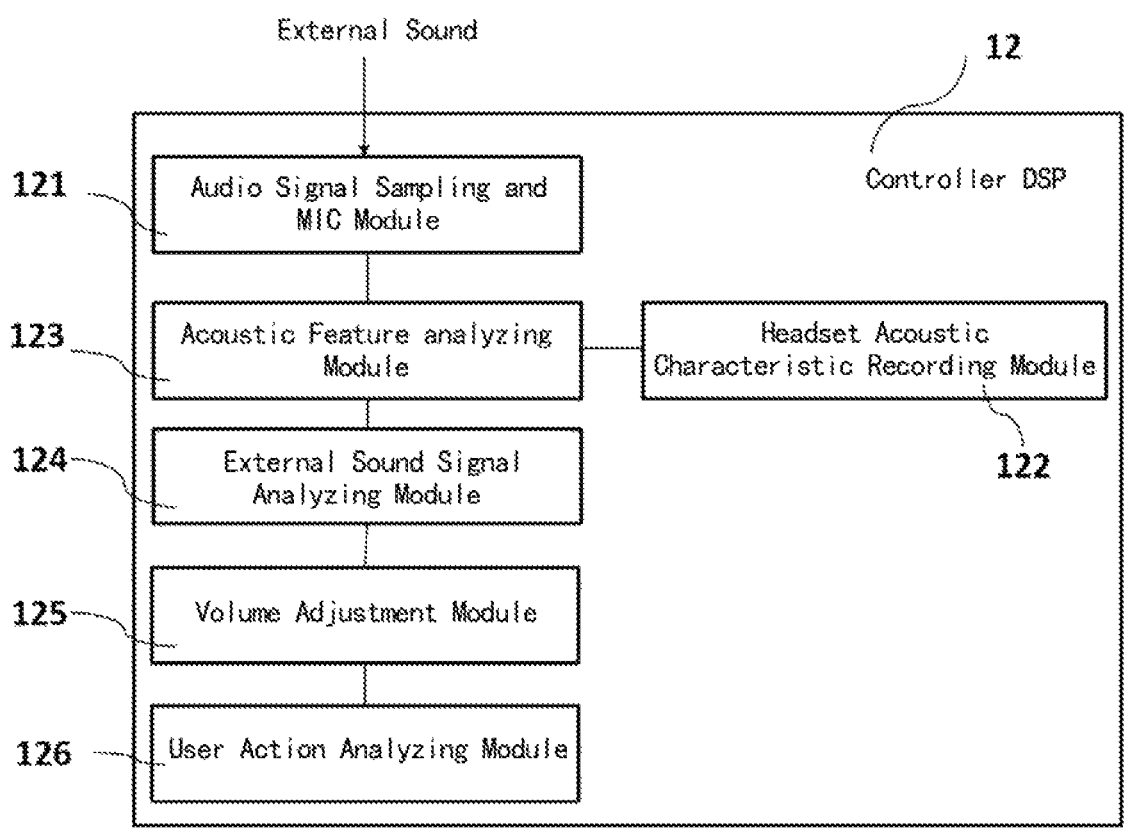
FIG. 7 shows a control module for automatic adjustment of a volume of a headset according to another embodiment of the present invention.

In the embodiment of FIGS. 5 and 6, the system inherent acoustic characteristic parameter of the headset, such as frequency response, delay and/or phase, is obtained by playing a sweep signal for testing through the speaker of the headset, sampling the sweep signal for testing through the audio signal sampling and MIC module, and testing and analyzing the sweep signal for testing.

When using the headset as shown in FIG. 5, an influence signal that affects the audio signal sampling and MIC module when the headset plays music may be obtained by performing a convolution operation on the music signal and the measured function of the system inherent characteristic of the headset, and an actual external signal (i.e., pure external noise and voice signal) may be obtained using the formula: "pure external signal"="incoming signal"−"influence signal". Further, the sizes of the voice component and the noise component may be identified by analyzing the frequency of the obtained pure external signal, and the volume may be adjusted correspondingly. The above processing of the digital signal may be performed in the DSP. The DSP may be provided inside the housing of the headset (such as, the wireless Bluetooth headset), and may be provided on one side of the sound source player.

In addition, the volume control method is not limited to the automatic control of the digital control circuit. For example, when the user is surrounded by noisy crowd, the user may determine by oneself whether the volume should be decreased to avoid any error action or bad experience. For example, an acceleration sensor may be provided in the headset, and when the user desires to decrease or increase the volume, the headset may be controlled to increase or decrease the volume or pause the playing by rapidly raising or lowering head. For example, the volume may be decreased by 10 dB by lowering head, and the volume may be increased by 10 dB by raising head.

The present invention further provides a storage medium for storing a program executing the volume control method in the above embodiment.

Of course, the present invention may have other embodiments, and those skilled in the art may make various modifications and variations without departing from the spirit and essence of the present invention, and these modifications and variations shall belong to the scope protected by the claims of the present invention.

The invention claimed is:

1. A control module for automatic adjustment of a volume of a headset, comprising:
   an audio signal sampling and MIC module for sampling an external real-time sound signal and converting the real-time sound signal into an electrical signal;
   a headset acoustic characteristic recording module for recording a system inherent acoustic characteristic of the headset;
   an acoustic feature analyzing module electrically connected to the audio signal sampling and MIC module and the headset acoustic characteristic recording module for removing an audio signal played by the headset from the real-time sound signal based on the system inherent acoustic characteristic of the headset to obtain a pure external noise and voice signal outside the headset;
   an external sound signal analyzing module electrically connected to the acoustic feature analyzing module for analyzing frequency features of the pure external noise and voice signal to obtain a strength of an external voice signal; and
   a volume adjustment module electrically connected to the external sound signal analyzing module for determining the condition a person speaking and automatically controlling the headset to lower the volume or mute when the strength of the external voice signal is larger than a preset threshold value.

2. The control module for automatic adjustment of a volume of a headset of claim 1, wherein the volume adjustment module automatically controls the headset to restore a normal volume when the strength of the external voice signal is determined to be less than the preset threshold value for a period of time.

3. The control module for automatic adjustment of a volume of a headset of claim 1, wherein the system inherent acoustic characteristic of the headset is obtained by playing a sweep signal for testing through a speaker of the headset.

4. The control module for automatic adjustment of a volume of a headset of claim 3, wherein the system inherent acoustic characteristic of the headset comprises a frequency response, a delay and/or a phase.

5. The control module for automatic adjustment of a volume of a headset of claim 4, wherein the acoustic feature analyzing module obtains the strength of the external voice signal by extracting a voice frequency component using a digital filter processing device and identifying the voice frequency component according to voice characteristic.

6. The control module for automatic adjustment of a volume of a headset of claim 5, wherein the acoustic feature analyzing module obtains a strength of an external noise component by filtering out the identified voice frequency component.

7. The control module for automatic adjustment of a volume of a headset of claim 5, wherein the digital filter processing device is a digital filter, or a filter unit inside a digital signal processor (DSP).

8. The control module for automatic adjustment of a volume of a headset of claim 6, wherein the volume adjustment module adjusts the volume of the headset according to a level of a strength of the external noise signal graded by the acoustic feature analyzing module.

9. The control module for automatic adjustment of a volume of a headset of claim 3, wherein the acoustic feature analyzing module performs a convolution operation on the audio signal and a measured function of the inherent acoustic characteristic of the headset to obtain an influence signal that affects the audio signal sampling and MIC module when the headset plays the audio signal.

10. The control module for automatic adjustment of a volume of a headset of claim 3, wherein the pure external noise and voice signal is obtained by removing the influence signal from an incoming signal of the audio signal sampling and MIC module using the external sound signal analyzing module.

11. The control module for automatic adjustment of a volume of a headset of claim 1, further comprising:

a user action analyzing module for identifying an action sensing signal of rapidly raising or lowering head of a user, wherein the volume adjustment module controls the headset to increase or decrease the volume or pause playing based on the action sensing signal.

12. A headset, comprising:

a housing provided with a sound output port;

a speaker provided inside the housing for playing an audio signal; and a controller electrically connected to the speaker, wherein the controller comprises the control module of claim 1.

13. The headset of claim 12, further comprising:

an acceleration sensor connected to the controller and provided inside the housing, for sampling an action sensing signal of rapidly raising or lowering head of a user of the headset, wherein the controller further comprises a user action analyzing module for identifying a received action sensing signal of rapidly raising or lowering head of the user, and wherein the volume adjustment module controls the headset to increase or decrease a volume or pause playing based on the action sensing signal.

14. A method for automatic adjustment of a volume of a headset, the method being implemented by the control module of claim 1, and the method comprising:

an audio signal sampling step for sampling a real-time sound signal outside the headset and converting the real-time sound signal into an electrical signal;

a headset acoustic characteristic recording step for recording a system inherent acoustic characteristic of the headset;

an acoustic feature analyzing step for removing an audio signal played by the headset from the real-time sound signal based on the system inherent acoustic characteristic of the headset to obtain a pure external noise and voice signal outside the headset;

an external sound signal analyzing step for analyzing frequency feature of the pure external noise and voice signal to obtain a strength of an external voice signal; and a volume adjustment step for determining the condition a person speaking and automatically controlling the headset to lower a volume or mute when the strength of the external voice signal is larger than a preset threshold value.

15. A storage medium for storing a program executing the method of claim 14.

\* \* \* \* \*